Patented Sept. 13, 1949

2,481,742

UNITED STATES PATENT OFFICE 2,481,742

CONDENSATION OF KETENES WITH QUINONES

Hugh J. Hagemeyer, Jr., Kingsport, Tenn., assignor to Eastman Kodak Company, Rochester, N. Y., a corporation of New Jersey No Drawing. Application February 7, 1948, Serial No. 6,988

12 Claims. (Cl. 260—344)

This invention relates to the preparation of chemical compounds by condensing a ketene with a quinone. More specifically this invention relates to a process for preparing β-lactones, i. e. lactones of β-hydroxy carboxylic acids, from ketenes and quinones.

Staudinger first showed that a keto ketene, such as diphenyl ketene, added to benzoquinone to produce β-lactones, Ann. 380, 244 (1911) and Ber. 41, 1355 (1908). Staudinger also showed that the β-lactones were easily decarboxylated to produce diolefins.

Aldo ketenes, on the other hand, are relatively unstable as compared with keto ketenes and dimerize rapidly, under ordinary conditions of temperature and pressure. In the absence of a catalyst, aldo ketenes do not condense with quinones, but form the dimer instead.

I have now found that, in the presence of boric acid, an ester of boric acid, or an acylated boric acid, ketenes (both aldo and keto ketenes) react with quinones to give β-lactones.

The catalysts of my process are superior to the Friedel-Crafts type of catalyst, in that separation of the reaction products from the reaction mixture can be accomplished in the presence of the catalyst. This is important since it is unnecessary to remove the catalyst by neutralization before the reaction mixture can be expeditiously separated into its component parts.

It is, therefore, an object of my invention to provide an improved process for preparing β-lactones. A further object of my invention is to provide a new class of unsaturated organic compounds. A still further object is to provide a process for preparing these new unsaturated organic compounds.

In accordance with my invention I prepare β-lactones by reacting a ketene (either an aldoketene or keto ketene) with a quinone in the presence of a catalyst selected from the group consisting of boric acid, an ester of boric acid, or an acylated boric acid.

The ketenes which are advantageously employed in my invention can be advantageously represented by the following general formula:

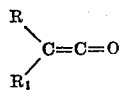

wherein R and R₁ each represents a member selected from the group consisting of a hydrogen atom, an alkyl group, such as methyl, ethyl, propyl, isopropyl, butyl, isobutyl (i. e. an alkyl group having the formula $C_nH_{2n+1}$ where $n$ is a positive integer from 1 to 4), and an aryl group (especially a phenyl group, i. e. a $C_6H_5$—group). Although my invention is directed primarily to a process involving ketene ($CH_2$=C=O), any aldo ketene or any keto ketene can be employed. Typical aldo ketenes include ketene, methyl ketene, ethyl ketene, etc. Typical keto ketenes include dimethyl ketene, diethyl ketene, diphenyl ketene, methyl phenyl ketene, etc.

The quinones which are advantageously employed in practicing my invention are the p-quinones. Typical of the unsubstituted quinones are p-benzoquinone, o- or 1,4-naphthoquinone, and anthraquinone. Typical of the substituted quinones are toluquinone, 2- and 5-methyl-1,4-naphthoquinones, and 2-methyl anthraquinones, o-, m- and p-xylo-p-quinones, 2,3-dimethyl-1,4-naphthoquinone, 2,6-dimethyl-1,4-naphthoquinone, 2,7-dimethyl-1,4-naphthoquinone, 3,5-dimethyl-1,4-naphthoquinone, 5,6-dimethyl-1,4-naphthoquinone, 6,7-dimethyl-1,4-naphthoquinone, 1,2-dimethyl anthraquinone, 1,3-dimethyl anthraquinone, chloro-p-benzoquinone, 2-chloro-1,4-naphthoquinone, 5-chloro-1,4-naphthoquinone, 1-chloro-anthraquinone, 2-chloroanthraquinone, 2,3-dichloro-p-benzoquinone, 2,5-dichloro-p-benzoquinone, 2,6-dichloro-p-benzoquinone, 2,3-dichloro-1,4-naphthoquinone, 2,6-dichloro-1,4-naphthoquinone, 5,6-dichloro-1,4-naphthoquinone, 5,8-dichloro-1,4-naphthoquinone, etc.

When a ketene condenses with p-benzoquinone in the presence of my boron containing catalysts, the reaction can be formulated as follows:

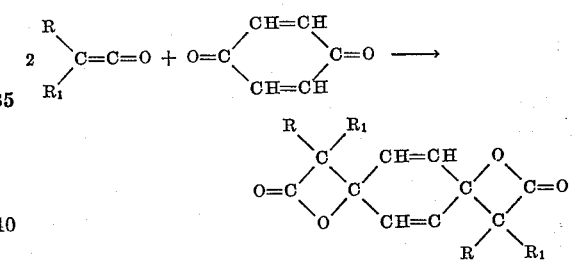

wherein R and R₁ have the above definitions. This β-lactone is conveniently not separated from the reaction mixture, but is heated so that carbon dioxide is evolved in accordance with the equation:

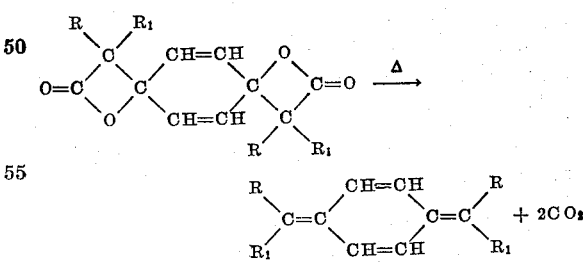

The catalysts which are advantageously employed in practicing my invention can be represented by the following general formula:

wherein $R_2$ represents a hydrogen atom, an alkyl group, such as methyl, ethyl, n-propyl, n-butyl, isobutyl (i. e. a primary alkyl group of the formula $C_nH_{2n+1}$ wherein $n$ represents a positive integer from 1 to 4), and an acyl group, such as acetyl or propionyl group (i. e., an aliphatic acyl group). Typical of the boron containing compounds formulated above are boric acid, trimethyl borate, triethyl borate, tri-n-propyl borate, tri-n-butyl borate, triacetyl boric acid, and tripropionyl boric acid. The acylated boric acids can advantageously be formed by bringing boric acid into contact with a ketene. Boric acid can be employed to especial advantage as a catalyst in practicing my invention. Although the process of my invention is practiced generally in the presence of one or more of the boron-containing catalysts formulated above, other catalysts can be used to produce β-lactones. Among those which may be mentioned are the Friedel-Crafts type of catalyst, such as aluminum trichloride, boron trifluoride, zinc chloride, etc., as well as the complexes of these catalysts formed with solvents such as diethyl ether and the like; the metal fluoborates, such as zinc, lead, ferrous, nickel, stannous, copper, and cobalt fluoborates; zinc nitrate; zinc thiocyanate, magnesium perchlorate; zinc perchlorate; etc. The boron-containing catalysts are advantageously employed due to ease with which the reaction mixture can be separated into its component parts.

The quantity of catalyst employed can be varied and optimum concentrations are usually a function of the reactants employed. Ordinarily a concentration of catalyst equal to from about 0.1 to about 3% by weight of the total material (all reactants plus solvent, if any) in the reaction mixture is advantageously employed. Higher concentrations of catalyst can be used, although there is generally no advantage in doing so.

The process of my invention can conveniently be carried out at temperatures as low as −50° C. or as high as +100° C. Temperatures between about 10 and 20° C. are ordinarily used, since no special cooling or heating apparatus are required.

Advantageously my new process is carried out in a solvent for the reactants, i. e., an organic liquid which dissolves both the ketene and the quinone, and which is relatively inert to the reactants. Suitable solvents include acetone, methyl ethyl ketone, the dialkyl ethers which are liquid at 10° C., e. g. diethyl ether, ethyl isopropyl ether, diisopropyl ether, ethyl-n-butyl ether, ethyl n-propyl ether, etc., cyclic ethers which are liquid at 10° C., e. g., 1,4-dioxane, chlorinated hydrocarbons which are liquid at 10° C., e. g. chloroform, carbon tetrachloride, ethylidene dichloride, ethylene dichloride, etc., hydrocarbons which are liquid at 10° C. e. g., benzene, toluene, o-, m- and p-xylenes, n-heptane, etc., and carbon bisulfide.

When the ketene is condensed with the quinone in some instances, a monolactone containing an unreacted keto or =C=O group is the chief reaction product. To complete the reaction more of the ketene is passed into the reaction until an excess has been added, thereby producing the di-β-lactone. If desired, the reaction mixture containing the monolactone can be heated to decarboxylate the lactone group to give an olefinic ketone. Ordinarily, however, I advantageously use an excess of the ketene to give the di-β-lactone.

Generally my process is carried out under atmospheric pressure; however, when the temperature used is such as would cause the solvent to volatilize, pressures above atmospheric, i. e. superatmospheric, pressure can be used.

In carrying out the process of my invention a solution containing the quinone can be added to a solution containing the catalyst while simultaneously adding a ketene. Still another manner in practicing my invention consists in adding the ketene to a solution containing the catalyst and the quinone.

The following examples will serve to illustrate further the manner of practicing my invention:

*Example I.—Condensation of ketene with p-benzoquinone*

54 grams of p-benzoquinone and 3 grams of the diethyl ether complex with boron trifluoride (boron trifluoride etherate) were dissolved in 400 ml. of 1,4-dioxane in a suitable reaction vessel. While the temperature was maintained at approximately 10° C., ketene ($CH_2=C=O$) was passed into the reaction mixture through a hollow, high-speed stirrer. After a total of 4 grams/mols (168 grams), of ketene had been added, the reaction mixture consisted largely of a solution containing the β-lactone having the formula:

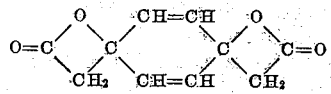

To this solution was added solid sodium hydroxide to neutralize the catalyst, and the solution was then filtered through diatomaceous earth. The filtrate was held under reflux for 30 minutes at 100 mm. pressure, and then distilled. A yield of 6 gms. of p-benzoquinone dimethylene, a clear, colorless liquid boiling at 45 to 47° C. at 20 mm., having the formula:

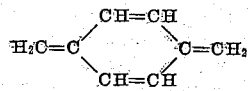

was obtained.

*Example II.—Condensation of ketene with p-benzoquinone*

A solution of 1 gm. of boric acid in 200 gms. of 1,4-dioxane was prepared. A solution of 27 gms. of p-benzobenzoquinone dissolved in 125 ml. of 1,4-dioxane was then added gradually over a period of 2 hours while gaseous ketene was added simultaneously through a hollow, high-speed stirrer. During the period of addition of the reactants the temperature was maintained at 20° C., and the total amount of ketene added was 1 gram/mol. (42 grams). The reaction mixture consisted largely of a solution containing the β-lactone having the formula:

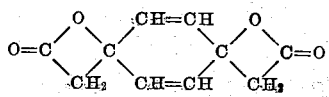

Without neutralizing the catalyst, the reaction mixture was distilled to give 4 gms. of p-benzoquinone dimethylene, boiling at 144 to 146° C. under 740 mm. pressure, and having the formula:

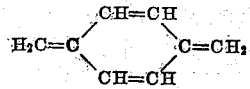

In a similar manner, when ketene ($CH_2=C=O$) is passed into 30 gms. of 1,4-naphthoquinone dissolved in a solution of 2 gms. of triethyl borate in 300 ml. of 1,4-dioxane until a total of about 17 gms. of ketene has been added, an excellent yield of the lactone having the formula:

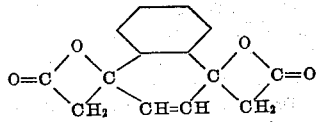

can be obtained. On distilling under reflux this lactone is decarboxylated into 1,4-naphthoquinone dimethylene having the formula:

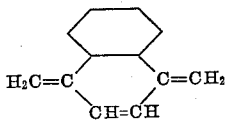

Similarly when 20 gms. of gaseous ketene are passed into a solution of 400 ml. of dioxane, 1 gm. of triacetyl boric acid, and 28 gms. of chloro-p-benzoquinone, an excellent yield of the lactone

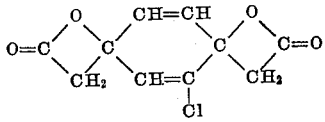

is obtained. This lactone is readily decarboxylated by heating to give chloro-p-benzoquinone dimethylene having the formula:

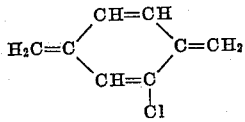

*Example III.—Condensation of diphenyl ketene with p-benzoquinone*

A solution of 10 gms. of p-benzoquinone and 0.05 gm. of zinc chloride in 200 ml. of xylene was prepared. Over a period of 30 minutes diphenyl ketene was slowly added until a total of 40 gms. had been added. During the period of addition of the diphenyl ketene the temperature of the reaction mixture was maintained at 20 to 25° C. The reaction mixture consisted largely of a xylene solution of the β-lactone having the formula:

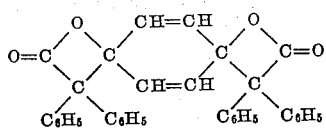

To the reaction mixture containing this β-lactone sodium acetate was added to neutralize the zinc chloride catalyst, and the solution was brought to vigorous reflux until the evolution of carbon dioxide gas ceased. Operating in this manner, 24 gms. of tetraphenyl-p-benzoquinone dimethylene, melting at 248° C., having the formula:

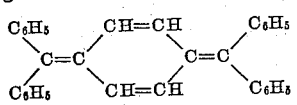

were obtained. The production of this compound has been previously described by Staudinger (Ber. 41, 1355), however my process constitutes an improvement in that the use of a catalyst permits the use of a greatly shortened reaction time, and materially increases the yield of the desired reaction product.

By substituting molecularly equivalent amounts of other aldo- or keto ketenes in the above examples, still other β-lactones and unsaturated compounds can be prepared. For example, when 11 gms. of monomethyl ketene are reacted with 10 gms. of toluquinone in the presence of 1 gm. of triethyl borate dissolved in 200 ml. of 1,4-dioxane at a temperature of from 15 to 20° C., a good yield of the lactone having the formula:

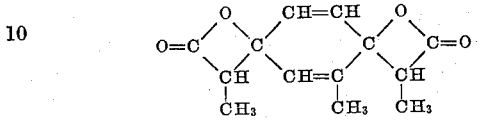

is obtained. On heating, this lactone readily loses carbon dioxide to produce dimethyl toluquinone dimethylene having the formula:

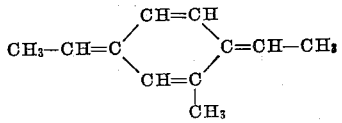

When 15 gms. of ketene is passed into a solution containing 300 ml. of 1,4-dioxane, 1.5 gms. of boric acid, and 24 gms. of p-xylo-p-quinone, a good yield of the lactone having the formula:

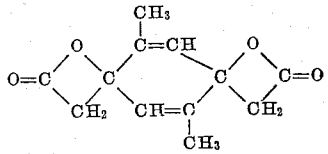

is produced. On heating this lactone readily loses carbon dioxide to produce the diolefin having the formula:

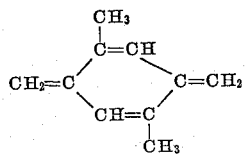

The unsaturated compounds or diolefins produced in accordance with the process of my invention are excellently suited as intermediates in the preparation of other organic compounds. For example, they can be chlorinated to produce compounds having valuable properties.

I claim:
1. A process for preparing a β-lactone which comprises reacting at a temperature of from —50 to 100° C. a ketene represented by the formula:

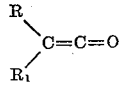

wherein R and $R_1$ each represents a member selected from the group consisting of a hydrogen atom, an alkyl group of the formula $C_nH_{2n+1}$ wherein $n$ represents a positive integer from 1 to 4, and a phenyl group, with a quinone in the presence of from 0.1 to 3% by weight of the total material in the reaction mixture of a boron compound represented by the formula:

wherein $R_2$ represents a member selected from the group consisting of a hydrogen atom, an alkyl group of the formula $C_nH_{2n+1}$ wherein $n$ represents a positive integer from 1 to 4, and an aliphatic acyl group.

2. A process for preparing a β-lactone which comprises reacting at a temperature of from —50 to 100° C. a ketene represented by the formula:

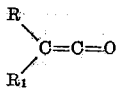

wherein R and R₁ each represents a member selected from the group consisting of a hydrogen atom, an alkyl group of the formula $C_nH_{2n+1}$ wherein $n$ represents a positive integer from 1 to 4, and a phenyl group, with a quinone in the presence of from 0.1 to 3% by weight of the total material in the reaction mixture of boric acid.

3. A process for preparing a β-lactone which comprises reacting at a temperature of from —50 to 100° C. a ketene represented by the formula:

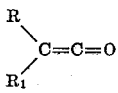

wherein R and R₁ each represents a member selected from the group consisting of a hydrogen atom, an alkyl group of the formula $C_nH_{2n+1}$ wherein $n$ represents a positive integer from 1 to 4, and a phenyl group, with a quinone in the presence of from 0.1 to 3% by weight of the total material in the reaction mixture of a boron compound represented by the formula:

wherein R₂ represents an alkyl group of the formula $C_nH_{2n+1}$ wherein $n$ represent a positive integer from 1 to 4.

4. A process for preparing a β-lactone having the formula:

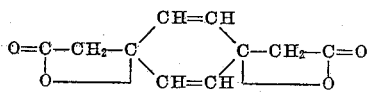

which comprises reacting at a temperature of from —50 to +100° C. ketene ($CH_2=C=O$) with p-benzoquinone in the present of from 0.1 to 3% by weight of the total material in the reaction mixture of a boron compound represented by the formula:

wherein R₂ represents a member selected from the group consisting of a hydrogen atom, an alkyl group of the formula $C_nH_{2n+1}$ wherein $n$ represents a positive integer from 1 to 4, and an aliphatic acyl group.

5. A process for preparing a β-lactone having the formula:

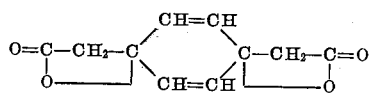

which comprises reacting at a temperature of from —50 to +100° C. ketene ($CH_2=C=O$) with p-benzoquinone in the presence of from 0.1 to 3% by weight of the total material in the reaction mixture of boric acid.

6. A process for preparing a β-lactone having the formula:

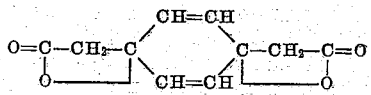

which comprises reacting at a temperature of from —50 to +100° C. ketene ($CH_2=C=O$) with p-benzoquinone in the presence of from 0.1 to 3% by weight of the total material in the reaction mixture of a boron compound represented by the formula:

wherein R₂ represents an alkyl group of the formula $C_nH_{2n+1}$ wherein $n$ represents a positive integer from 1 to 4.

7. A process for preparing a β-lactone which comprises reacting at a temperature of from —50 to 100° C. a ketene represented by the formula:

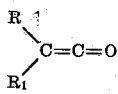

wherein R and R₁ each represents a member selected from the group consisting of a hydrogen atom, an alkyl group of the formula $C_nH_{2n+1}$ wherein $n$ represents a positive integer from 1 to 4, and a phenyl group, with a quinone in the presence of from 0.1 to 3% by weight of the total material in the reaction mixture of a boron compound represented by the formula:

wherein R₂ represents a member selected from the group consisting of a hydrogen atom, an alkyl group of the formula $C_nH_{2n+1}$ wherein $n$ represents a positive integer from 1 to 4, and an aliphatic acyl group, in the presence of a solvent selected from the group consisting of acetone, 1,4-dioxane, methyl ethyl ketone, diethyl ether, diisopropyl ether, ethyl chloride, carbon bisulfide, carbon tetrachloride, benzene, toluene and xylene.

8. A process which comprises reacting a ketene having the formula:

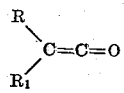

wherein R and R₁ each represents a member selected from the group consisting of a hydrogen atom, an alkyl group of the formula $C_nH_{2n+1}$ wherein $n$ represents a positive integer from 1 to 4, and a phenyl group with a quinone at a temperature of from —50 to +100° C. in the presence of from 0.1 to 3% by weight of the total material in the reaction mixture of a boron compound represented by the formula:

wherein R₂ represents a member selected from the group consisting of a hydrogen atom, an alkyl group of the formula $C_nH_{2n+1}$ wherein $n$ represents a positive integer from 1 to 4, and an aliphatic acyl group, thereafter distilling the crude reaction mixture until the evolution of carbon dioxide gas has ceased, and separating the formed unsaturated compound.

9. A process for preparing p-benzoquinone dimethylene represented by the formula:

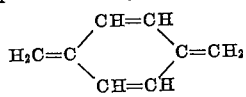

which comprises reacting ketene ($CH_2=C=O$) with p-benzoquinone at a temperature of from $-50$ to $+100°$ C. in the presence of from 0.1 to 3% by weight of the total material in the reaction mixture of a boron compound represented by the formula:

wherein $R_2$ represents a member selected from the group consisting of a hydrogen atom, an alkyl group of the formula $C_nH_{2n+1}$ wherein $n$ represents a positive integer from 1 to 4, and an aliphatic acyl group, thereafter distilling the crude reaction mixture at atmospheric pressure until the evolution of carbon dioxide ceases, and recovering the p-benzoquinone dimethylene.

10. A process for preparing p-benzoquinone dimethylene represented by the formula:

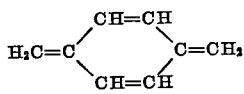

which comprises reacting ketene ($CH_2=C=O$) with p-benzoquinone at a temperature of from $-50$ to $+100°$ C. in the presence of from 0.1 to 3% by weight of the total material in the reaction mixture of boric acid, thereafter distilling the crude reaction mixture at atmospheric pressure until the evolution of carbon dioxide ceases, and recovering the p-benzoquinone dimethylene.

11. As a new compound, benzoquinone dimethylene having the formula:

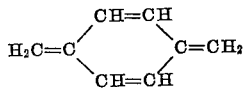

12. As a new compound, the lactone having the formula:

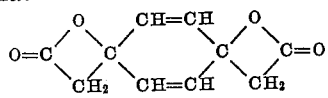

HUGH J. HAGEMEYER, JR.

REFERENCES CITED

The following references are of record in the file of this patent:

UNITED STATES PATENTS

| Number | Name | Date |
|---|---|---|
| 1,879,767 | Schoeller et al. | Sept. 27, 1932 |
| 2,356,459 | Kung | Aug. 22, 1944 |
| 2,361,036 | Kung | Oct. 24, 1944 |

OTHER REFERENCES

Staudinger, Berichte, J. 41, 1908, pages 1355, 1356, 1357.